A. H. Gilman,

Lubricating Spindles.

No. 2,544. Reissued Apr. 9, 1867.

Witnesses.

Charles A. Shaw

John F. Lord

Inventor.

Albert H. Gilman

AM. PHOTO-LITHO. CO. N.Y. (OSBORNE'S PROCESS.)

United States Patent Office.

ALBERT H. GILMAN, OF MILFORD, MASSACHUSETTS, ASSIGNEE BY MESNE ASSIGNMENTS OF HIMSELF.

*Letters Patent No.* 43,153, *dated June* 14, 1864; *reissue No.* 2,544, *dated April* 9, 1867.

IMPROVEMENT IN MODE OF LUBRICATING THE BEARINGS OF SPINNING-FRAMES.

The Schedule referred to in these Letters Patent and making part of the same.

TO ALL PERSONS TO WHOM THESE PRESENTS SHALL COME:

Be it known that I, ALBERT H. GILMAN, late of Biddeford, in the county of York, and State of Maine, but now residing at Milford, in the county of Worcester, and State of Massachusetts, have invented a new and useful Improvement in Spinning-Frames; and I do hereby declare that the following is a full, clear, and exact description of the same, reference being had to the accompanying drawings, of which—

Corresponding letters refer to corresponding parts.

Figure 1:
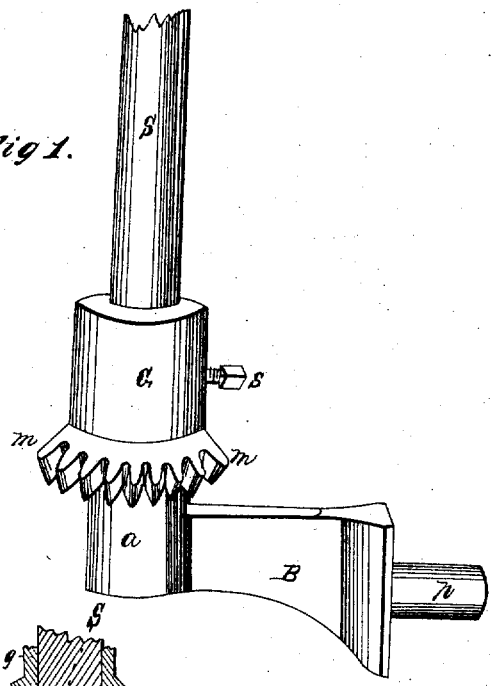
Figure 1 is a perspective view of a section of a spindle and a spindle gear, and step or stand, as arranged for use, when constructed according to my improved plan.

In the manufacture of cotton, great difficulty is experienced in keeping the bearings or "steps" of the spindles properly lubricated, particularly in that class of spinning-frames known as "slubbers" and "fly frame," to which my invention is more particularly applicable. In such frames, the spindles on which the bobbins containing the roving or yarn are placed, stand in steps, attached to the spindle rail, and rise and fall with it; rotary motion being also at the same time communicated to them by means of well-known mechanism disposed in the frame, and by means of the spindle gear. The arrangement of the parts in question will be better understood by reference to fig. 1, in which—

Figure 2:
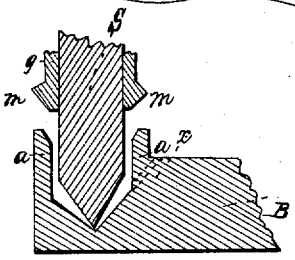
Figure 2 is a transverse sectional view of a spindle, spindle gear, and step of the ordinary construction, as arranged for use.
Figure 3:
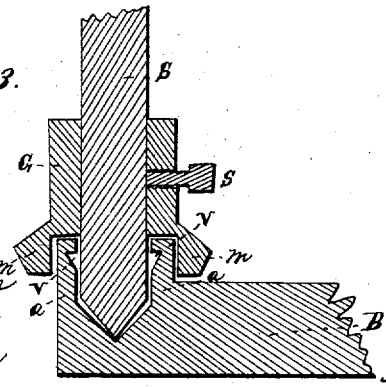
Figure 3 is a transverse sectional view of a spindle, spindle gear, and step, constructed and arranged according to my plan.

B is the body of the spindle step, *p* being the stud by which it is attached to the spindle or rail. The part *a* of the step is bored or drilled out into a cup for the lower end of the spindle to stand in. G is the spindle gear, having bevelled cogs or teeth, *m m*, and is attached to the spindle S by the set-screw *s*. A spindle, spindle-gear, and step of the style in common use, are shown in fig. 2, and also their relative positions when in use, in which figure the end *a a* of the step B is turned out cup-shaped, as shown, and the spindle-gear is arranged on the spindle above the cup of the step, being so constructed as not to pass down over the cup of the step. When a spindle is operated in connection with such a step, the oil in the cup used for lubricating will be nearly or entirely thrown out by the centrifugal force of the spindle and the cup left dry, thus greatly increasing the friction and making a proportionate increase of power or force to drive the frame requisite. Another and an important objection to the construction and arrangement of the parts in the manner shown in fig. 2 is that the gear G, by not passing down over the cup *a a*, allows particles of cotton to collect around the spindle, between the gear and step and in the cup, thus forming, as the spindle rotates, a sort of "swab" or "wiper," which takes up the oil, and leaves the cup or bearing dry. But these difficulties are entirely overcome by my improvement, which will be understood by the following description, and by reference to fig. 3. In order to prevent the oil from being thrown from the cup by the rotating spindle, I turn out or construct near the top of the interior of the cup, the chamber U U, as shown, the operation and use of which are to catch and retain the oil as it is thrown upward by the spindle, in such a manner that a sufficient quantity is dealt out to the spindle to lubricate it when in motion, the oil falling to the bottom of the cup when the spindle is at rest. To prevent the cotton from gathering between the gear and cup, or in the cup, as described, I cut out or make the lower end of the gear so that it will pass down over the top of the cup like a flanged cover, as shown, and in order that the gear may be so constructed and used, and still intersect properly with the gear and mechanism by which the spindle is driven, I cast or construct the top of the cup higher or longer than it is usual to make it, so that the gear will cover the cup without sitting too low on the spindle. In the ordinary style of spindle, as shown, the oil is sometimes passed into the cup through an oblique hole or aperture running from the outside of the step to the bottom of the cup, as indicated by the dotted lines *x* in fig. 2. But this method is open to the objections which apply to a cup without this hole, as the oil is forced back through it by the action of the spindle, and "sucked up" or exhausted by the cotton which collects on the outside of the step and in the hole. The hole is also liable to become entirely stopped up so that the oil cannot pass to the cup. To oil the spindle, where my improvement is used, the spindle and its gear are raised and the oil poured directly into the cup, thus insuring perfect lubrication.

I am aware that in the "Student's Guide to Locomotive Engines," in plate 28, fig. 51, a grease box or oil cup is represented with a cavity, groove, or chamber, for preventing the oil from being thrown from the cup. I am also aware that in the application of Richard A. Eddy for a patent for a spindle step, withdrawn May 26, 1851, a groove or chamber is shown which is substantially the same as that shown in my drawings. I therefore do not claim such a groove or chamber as of my invention. I am also aware that in the application and drawings of the said Eddy, a tubular cap is described and shown, through which the spindle passes, and which cap rests on and partly in the step or bearing of the spindle, but said cap is essentially different from mine, and does not accomplish the same valuable results. In Eddy's step, the cap does not pass down over the bearing or step at all, but its lower end is cone-shaped, and it sits loosely in a corresponding cavity in the top of the step proper, and when it is made to fit the spindle so closely as to prevent the fibres or small particles of cotton from falling into the step, there will necessarily be considerable friction between the cap and the spindle itself, requiring to be overcome with an additional quantity of oil, and when the cap does not fit closely to the spindle, the cotton will pass into the cup and rapidly exhaust the oil. When such a cap is fitted so closely to the spindle as to turn with it, but still admits of being slipped on the spindle, oil will be drawn up by capillary attraction to a greater or less degree, especially between the lower part of the cap and top of the step, and this notwithstanding the groove or chamber, and to a much greater degree where a cap is used which is in contact with the step, or spindle and step, than where none at all is used, or where the cap is so arranged as to cover the step but not to be in contact with it as in mine. Another objection to a cap arranged as shown in the alleged invention of the said Eddy is the largely increased cost of manufacture, a gear having to be used in addition to the cap, which, when mounted on the spindle in connection therewith, complicates the whole bearing, rendering it much more difficult to oil and keep clean, as is well known to all practical manufacturers who have used them arranged in that manner. I use a groove or chamber to prevent the oil from being thrown from the cup by the centrifugal force of the spindle, but construct the cup above the groove so that the spindle does not come into contact with the step at that part, thus preventing friction; and by chambering the gear in the manner shown I make the gear itself a perfect cap, thus lessening the number of parts, decreasing the cost materially, rendering the step easily oiled and kept clean, entirely preventing all particles of cotton from entering the cup of the step, as well as preventing waste of oil to a degree which I have never seen attained by any other arrangement. Spindles arranged according to my improved plan are running ten hours a day for six weeks without oiling, while spindles arranged according to the plan described by Eddy, in the same mill, can be run but one week, and spindles without either cap or groove but two days, with the same amount of oil.

I therefore do not claim anything whatever which is shown or described in the application of said Eddy, hereinbefore referred to, but, having made a spindle-step cap, combined with the spindle, so as to revolve with it and extend over, cover, and embrace the oil-receiving step of the spindle, as set forth, and also having combined directly, or in one piece, with a cap so made, the teeth of a gear in order that the said teeth and cap may be made to subserve two purposes, viz, to act as a gear to revolve the spindle, and as a cap and to cover and embrace the spindle step as set forth, I would remark that my invention and what I claim are as follows:

I claim a spindle-step cap, combined or to be connected with the spindle, so as to revolve with it, and made so as to extend over and embrace or go around the spindle step, and so applied to the spindle as to be capable of being moved lengthwise thereon, and fastened in place thereon by a clamp-screw or its equivalent, the whole being substantially as and for the purpose or purposes as explained.

I also claim a spindle gear, made so as to be movable lengthwise on its spindle, and provided with a screw or its equivalent to fasten it in place thereon, and so constructed that the gear itself shall form a cap for and pass down over or around the step without being in contact with it, substantially in the manner and for the purpose shown and specified.

I also claim the combination and arrangement of the groove *v*, with the step *a*, and with the cap G, made so as to extend over and embrace or go around the said step, as specified.

ALBERT H. GILMAN.

Witnesses:

R. H. EDDY,

F. P. HALE, Jr.